United States Patent
Takahashi

(10) Patent No.: US 12,462,374 B2
(45) Date of Patent: Nov. 4, 2025

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Kosei Takahashi, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 239 days.

(21) Appl. No.: 18/488,424

(22) Filed: Oct. 17, 2023

(65) Prior Publication Data
US 2024/0062360 A1 Feb. 22, 2024

Related U.S. Application Data

(63) Continuation of application No. 17/183,804, filed on Feb. 24, 2021, now Pat. No. 11,854,183.

(30) Foreign Application Priority Data

Feb. 26, 2020 (JP) .................. 2020-030846

(51) Int. Cl.
*G06T 7/00* (2017.01)
(52) U.S. Cl.
CPC ............ *G06T 7/0008* (2013.01); *G06T 7/001* (2013.01); *G06T 2207/30144* (2013.01); *G06T 2207/30168* (2013.01)
(58) Field of Classification Search
CPC .................. G06T 7/0008; G06T 7/001; G06T 2207/30144; G06T 2207/30168
See application file for complete search history.

(56) References Cited

U.S. PATENT DOCUMENTS 9,131,187 B2 * 9/2015 Shijoh ................. H04N 1/444
2002/0172397 A1 * 11/2002 Rhoads ............... G06T 7/0002
382/100

(Continued)

FOREIGN PATENT DOCUMENTS

JP 2005271331 A 10/2005
JP 2015179073 A 10/2015

OTHER PUBLICATIONS

Office Action issued in U.S. Appl. No. 17/183,804, mailed on Dec. 6, 2022.

(Continued)

*Primary Examiner* — Santiago Garcia
(74) *Attorney, Agent, or Firm* — ROSSI, KIMMS & McDOWELL LLP

(57) ABSTRACT

An image processing apparatus comprises a first acquisition unit configured to acquire a first image obtained by scanning a first printed material printed based on print data, a second acquisition unit configured to acquire one or more second images obtained by scanning a second printed material printed based on the print data, and a generation unit configured to generate an image obtained from the first image and at least one second images among the one or more second images acquired by the second acquisition unit, as a reference image to be compared with a third image obtained by scanning a third printed material printed based on the print data in order to inspect presence or absence of a defect in the third image.

11 Claims, 7 Drawing Sheets

(56) References Cited

U.S. PATENT DOCUMENTS

| | | | |
|---|---|---|---|
| 2003/0179920 A1* | 9/2003 | Hooker | G06T 7/001 382/141 |
| 2004/0057629 A1* | 3/2004 | Shikami | G06T 7/155 382/254 |
| 2013/0301067 A1* | 11/2013 | Nakamura | H04N 1/00082 358/1.13 |
| 2014/0320896 A1* | 10/2014 | Srivatsan | H04N 1/32122 358/1.15 |
| 2015/0243010 A1* | 8/2015 | Kaneko | G06T 7/001 382/112 |
| 2017/0036471 A1* | 2/2017 | Biffert | B41J 3/407 |
| 2019/0003985 A1* | 1/2019 | Yamazaki | G06T 7/001 |
| 2019/0289152 A1* | 9/2019 | Tsue | H04N 1/409 |
| 2020/0111199 A1* | 4/2020 | Ikeda | G06T 7/11 |
| 2020/0233618 A1* | 7/2020 | Ayukawa | G06F 3/1218 |
| 2020/0234423 A1* | 7/2020 | Oki | G06T 7/001 |
| 2021/0073966 A1* | 3/2021 | Teshima | G06T 7/001 |
| 2021/0082100 A1* | 3/2021 | Tsukamoto | G06T 7/001 |
| 2021/0114368 A1* | 4/2021 | Ukishima | G06N 3/084 |
| 2021/0311010 A1* | 10/2021 | Miyazawa | G07G 1/0063 |
| 2021/0312216 A1* | 10/2021 | De Gouveia | G06Q 10/0837 |
| 2021/0337073 A1* | 10/2021 | Lin | G06V 30/40 |
| 2021/0364447 A1* | 11/2021 | Naruse | G06T 7/001 |

OTHER PUBLICATIONS

Office Action issued in U.S. Appl. No. 17/183,804, mailed on Apr. 28, 2023.
Notice of Allowance issued in U.S. Appl. No. 17/183,804, mailed on Sep. 13, 2023.

* cited by examiner

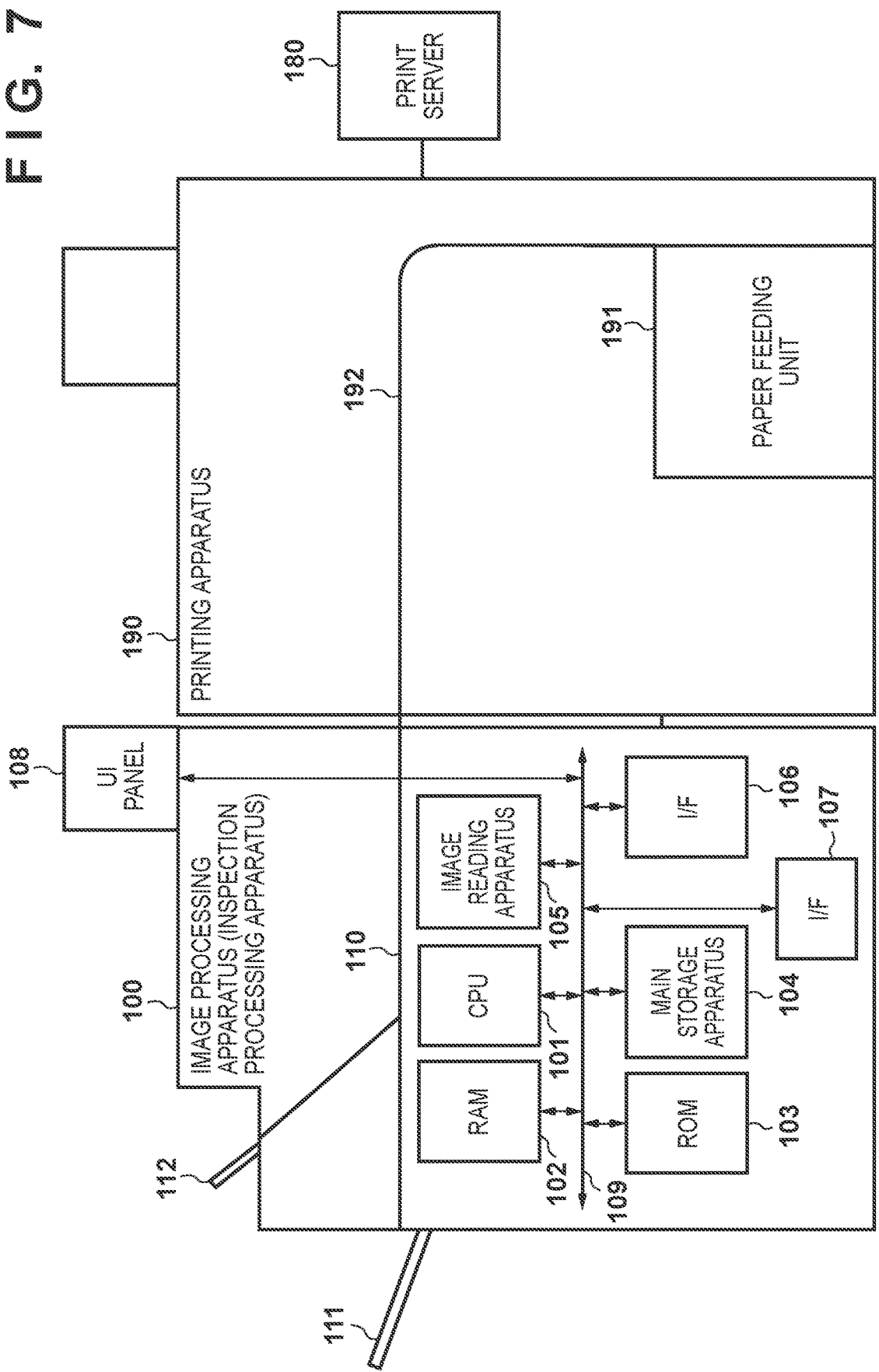

F I G. 8
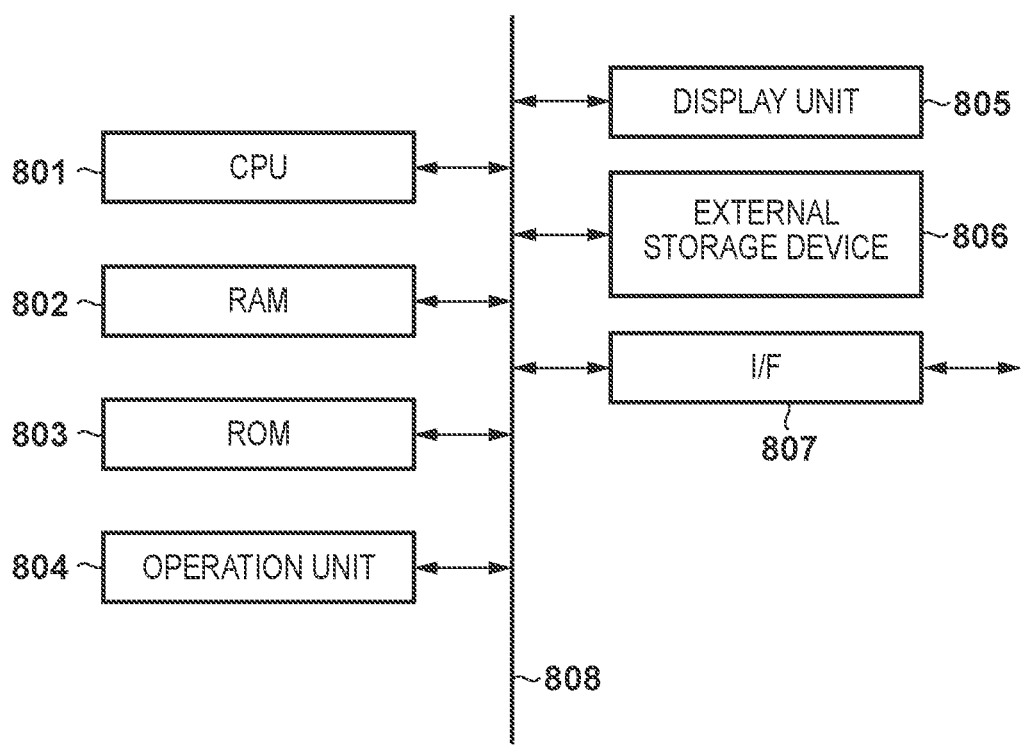

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for inspecting the presence or absence of a defect on a printed material.

Description of the Related Art

There may be cases where a printed material output by a printing apparatus is stained due to adherence of color material such as ink or toner on an unexpected location. Alternatively, color loss, i.e., color turning lighter than what was originally intended due to insufficient color material adhering to a location where the color material is supposed to adhere to form an image may occur. The so-called print defect such as a stain or color loss described above may result in a reduced quality of the printed material. Accordingly, there may be cases of inspecting whether or not there exists a defect on the printed material so as to ensure the quality of the printed material. Visual inspection by which an inspector visually inspects the presence or absence of a defect requires a large amount of time and cost, and therefore, in recent years, there are proposed inspection systems that automatically inspect without depending on visual inspection.

For an inspection system that automatically inspects the presence or absence of a defect on a printed material, there is a method for calculating the presence or absence of a defect from a difference value between a reference image data acquired by scanning a defect-free printed material and scanned data of a printed material to be an inspection target. Here, Japanese Patent Laid-Open No. 2015-179073 discloses a method for preparing a plurality of reference images as a method for improving the inspection precision. The method is one that calculates respective differences between an inspection target image and a plurality of reference images, and determines the presence or absence of a defect from a combination exhibiting the smallest difference.

However, the technique disclosed in Japanese Patent Laid-Open No. 2015-179073, may induce over-detection or false-detection in a case where a large amount of noise is included in the reference image, or the reference image itself includes a defect.

SUMMARY OF THE INVENTION

The present invention provides a technique for improving the inspection precision when inspecting the presence or absence of a defect on a printed material.

According to the first aspect of the present invention, there is provided an image processing apparatus comprising: a first acquisition unit configured to acquire a first image obtained by scanning a first printed material printed based on print data; a second acquisition unit configured to acquire one or more second images obtained by scanning a second printed material printed based on the print data; and a generation unit configured to generate an image obtained from the first image and at least one second images among the one or more second images acquired by the second acquisition unit, as a reference image to be compared with a third image obtained by scanning a third printed material printed based on the print data in order to inspect presence or absence of a defect in the third image.

According to the second aspect of the present invention, there is provided an image processing method comprising: acquiring a first image obtained by scanning a first printed material printed based on print data; acquiring one or more second images obtained by scanning a second printed material printed based on the print data; and generating an image obtained from the first image and at least one second images among the one or more second images, as a reference image to be compared with a third image obtained by scanning a third printed material printed based on the print data in order to inspect presence or absence of a defect in the third image.

According to the third aspect of the present invention, there is provided a non-transitory computer-readable storage medium storing a computer program for causing a computer to function as: a first acquisition unit configured to acquire a first image obtained by scanning a first printed material printed based on print data; a second acquisition unit configured to acquire one or more second images obtained by scanning a second printed material printed based on the print data; and a generation unit configured to generate an image obtained from the first image and at least one second images among the one or more second images acquired by the second acquisition unit, as a reference image to be compared with a third image obtained by scanning a third printed material printed based on the print data in order to inspect presence or absence of a defect in the third image.

Further features of the present invention will become apparent from the following description of exemplary embodiments with reference to the attached drawings.

BRIEF DESCRIPTION OF THE DRAWINGS

FIG. 7 illustrates a configuration example of a printing system; and

FIG. 8 is a block diagram illustrating a hardware configuration example of a computer apparatus.

DESCRIPTION OF THE EMBODIMENTS

Figure 1:
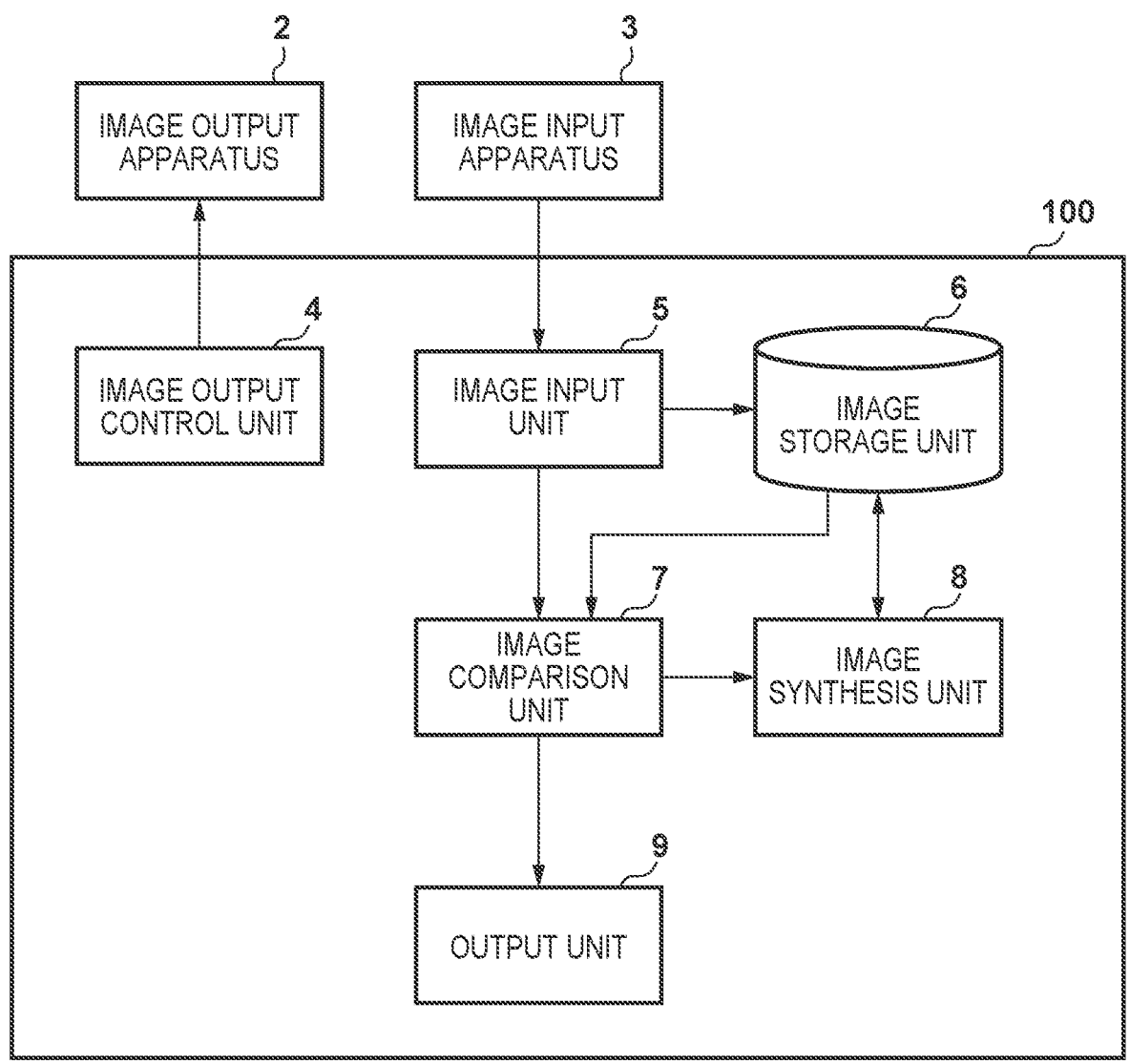
FIG. 1 is a block diagram illustrating a functional configuration example of an image processing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be

First Embodiment

First, there will be described a functional configuration example of an image processing apparatus 100 operating as an inspection processing apparatus that inspects the presence or absence of a defect on a printed material, referring to the block diagram of FIG. 1. Here, "defect on a printed material" is intended to refer to a so-called print defect (that degrades the quality of the printed material), such as a stain or color loss on the printed material, as described above.

An image output apparatus 2, which is a printing apparatus such as an electrophotographic printer or an inkjet printer, generates a printed material by forming images or characters on a print medium such as paper based on print data supplied from the image processing apparatus 100. An image input apparatus 3, which is an image scanning device such as a scanner, scans a printed material to generate a scanned image of the printed material. An image output control unit 4, which is intended to control the operation of the image output apparatus 2, generates print data of images or characters to be printed by the image output apparatus 2, and supplies the generated print data to the image output apparatus 2 to perform a printing process based on the print data. An image input unit 5 acquires the scanned image of the printed material generated by the image input apparatus 3, and stores the acquired scanned image in an image storage unit 6. An image comparison unit 7 compares images to determine whether or not a defect exists in one of the images. An image synthesis unit 8 generates, via image synthesis, a reference image to be based on when inspecting the presence or absence of a defect. An output unit 9 outputs an inspection result for a scanned image of a target printed material for inspection of the presence or absence of a defect.

Figure 2:
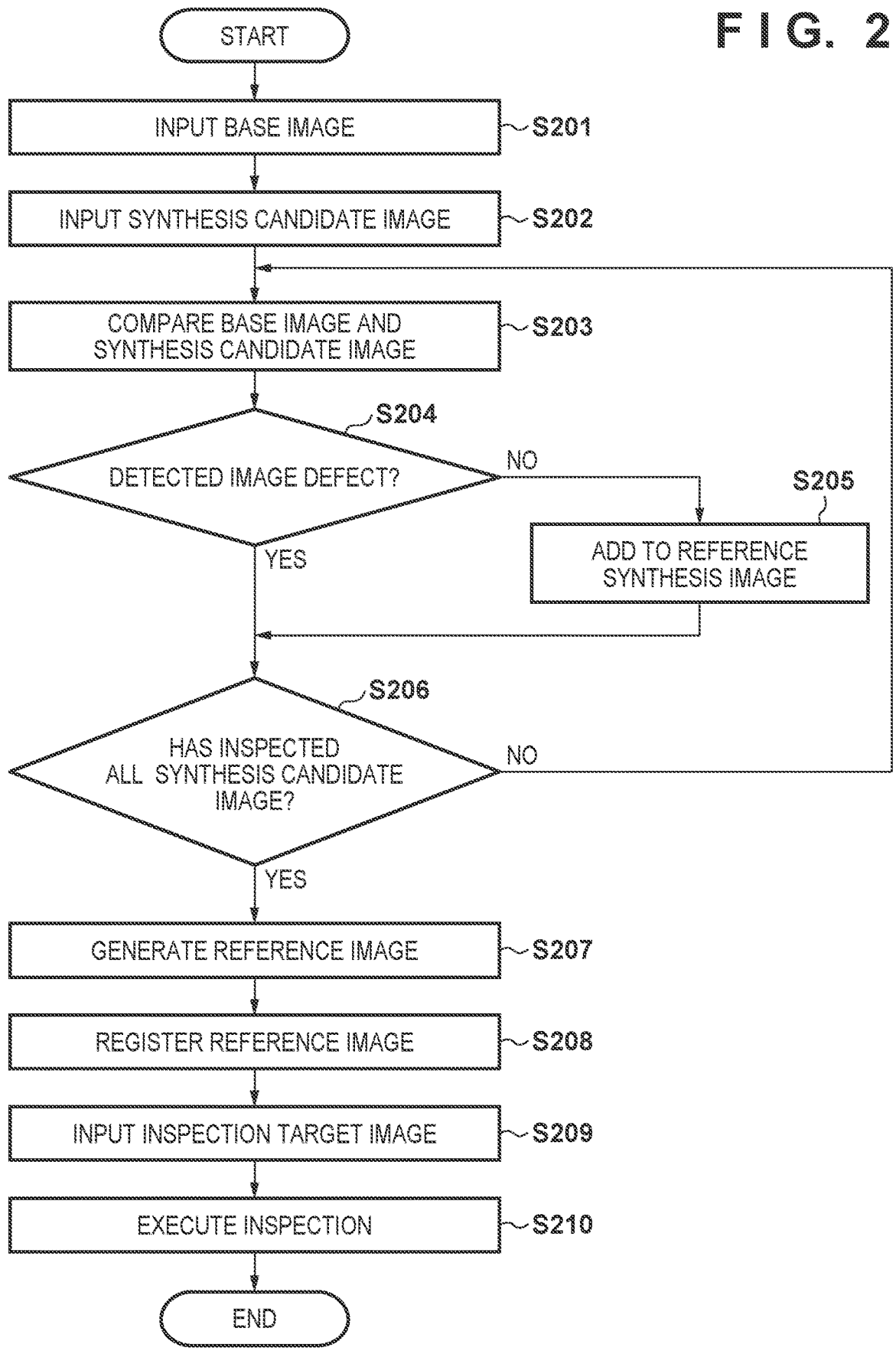
FIG. 2 is a flowchart illustrating a process performed by the image processing apparatus 100.

Next, there will be described a process performed by the image processing apparatus 100 in order to inspect the presence or absence of a defect on the printed material, referring to the flowchart of FIG. 2. The process according to the flowchart of FIG. 2 includes a process of generating a reference image to be based on when inspecting the presence or absence of a defect, and a process of inspecting the presence or absence of a defect on the printed material using the reference image.

The image input apparatus 3 scans a "printed material without any defect (defect-free printed material)" generated by the image output apparatus 2 based on the print data supplied from the image output control unit 4, and generates a scanned image of the defect-free printed material. At step S201, the image input unit 5 acquires the scanned image of the defect-free printed material from the image input apparatus 3, and stores the acquired scanned image in the image storage unit 6 as a base image.

Next, after having generated the defect-free printed material, the image output control unit 4 supplies the same print data as the print data of the defect-free printed material to the image output apparatus 2 and controls the image output apparatus 2 to generate one or more printed materials. As a result, the image output apparatus 2 generates one or more printed materials (sample printed materials) based on the print data. There is a possibility that all the sample printed materials are "defect-free printed materials", and there is also a possibility of coexistence of "defect-free printed materials" and "defective printed materials". The image input apparatus 3 scans the one or more sample printed materials to generate scanned images of the sample printed materials. At step S202, the image input unit 5 acquires scanned images of such one or more sample printed materials from the image input apparatus 3, and stores the acquired scanned images in the image storage unit 6 as synthesis candidate images.

At step S203, the image comparison unit 7 selects a yet-to-be-selected synthesis candidate image as a selected image from the one or more synthesis candidate images stored in the image storage unit 6. The image comparison unit 7 then compares the selected image with the base image stored in the image storage unit 6.

Subsequently, at step S204, the image comparison unit 7 determines whether or not there exists a defect in the selected image (sample printed material), as a result of the comparison at step S203. Details of the processes at steps S203 and S204 will be described below. When, as a result of the determination, it is determined that there exists a defect in the selected image, the process proceeds to step S206, or the process proceeds to step S205 when it is determined that the selected image is defect-free. At step S205, the image synthesis unit 8 sets the selected image as a reference synthesis image to be synthesized with the base image.

At step S206, the image comparison unit 7 determines whether or not all of the one or more synthesis candidate images stored in the image storage unit 6 have been selected as selected images. When, as a result of the determination, all of the one or more synthesis candidate images stored in the image storage unit 6 have been selected as selected images, the process proceeds to step S207. When, on the other hand, there remains a synthesis candidate image which have not yet been selected as a selected image, among the one or more synthesis candidate images stored in the image storage unit 6, the process proceeds to step S203.

At step S207, the image synthesis unit 8 generates, as a reference image, a synthesis image by synthesizing the base image and all the reference synthesis images. Details of the process at step S207 will be described below. Subsequently, at step S208, the image synthesis unit 8 stores (registers), in the image storage unit 6, the reference image generated at step S207.

Next, the image output control unit 4 supplies the same print data to the image output apparatus 2 as the print data of the defect-free printed material, and controls the image output apparatus 2 to generate a printed material. Accordingly, the image output apparatus 2 generates a printed material as a "printed material to be inspected for the presence or absence of a defect (inspection target printed material)." The image input apparatus 3 scans the inspection target printed material and generates a scanned image of the inspection target printed material. At step S209, the image input unit 5 acquires the scanned image of such an inspection target printed material from the image input apparatus 3 as the inspection target image.

At step S210, the image comparison unit 7 compares the reference image stored in the image storage unit 6 at step S208 with the inspection target image acquired at step S209 to determine whether or not there exists a defect in the inspection target image (inspection target printed material). The process at step S210 is performed similarly to steps S203 and S204 described above. The output unit 9 then outputs the result of determination by the image comparison unit 7.

When a defect has been found in the inspection target image (inspection target printed material), the output unit 9 may, for example, indicate on the display unit (not illustrated) that a defect has been found on the inspection target printed material, or may indicate on the display unit that no defect has been found on the inspection target printed material when no defect has been found in the inspection target image. In addition, the output unit 9 may display the inspection target image and display a marker such as a frame or the like in a superimposed manner at the location of the defect in the inspection target image so as to notify the user of the location explicitly. Here, the output destination or output form of the result of determination by the image comparison unit 7 is not limited to any specific output destination or output form.

Figure 3A:
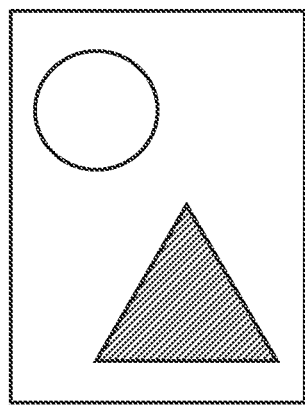
FIG. 3A illustrates details of a process of determining whether or not there exists a defect in a selected image.
Figure 3B:
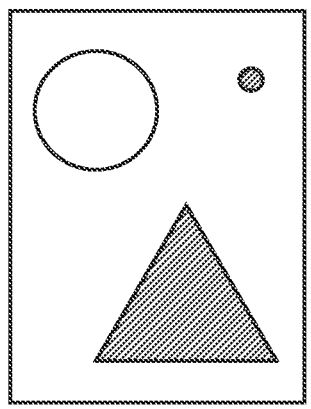
FIG. 3B illustrates details of the process of determining whether or not there exists a defect in the selected image.
Figure 3C:
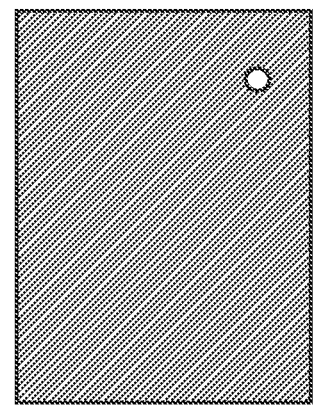
FIG. 3C illustrates details of the process of determining whether or not there exists a defect in the selected image.

Next, there will be described details of the process of determining whether or not there exists a defect in the selected image based on the result of image comparison at step S203 described above, taking FIGS. 3A to 3C as an example. FIG. 3A illustrates an example of the base image acquired at step S201, and FIG. 3B illustrates an example of the selected image selected at step S203. In this case, the image comparison unit 7 first generates a difference image between the base image in FIG. 3A and the selected image in FIG. 3B. As is known, a pixel value of a pixel at a pixel position P in a difference image between two images indicates a difference value (absolute value) between the pixel value of the pixel at the pixel position P of one of the two images and the pixel value of the pixel at the pixel position P in the other one of the two images. An example of a difference image between the base image of FIG. 3A and the selected image of FIG. 3B is illustrated in FIG. 3C. Subsequently, when there exists an image region in the difference image including pixels whose pixel values are equal to or larger than a threshold value, the image comparison unit 7 identifies the image region corresponding to the image region in the selected image as a "location of defect in the selected image". Here, the selected image is determined to be defect-free when there is no image region in the difference image including pixels whose pixel value is equal to or larger than the threshold value. In the case of step S210, performing a similar process using the inspection target image instead of the selected image allows for inspecting the presence or absence of a defect in the inspection target image.

Next, there will be described a process of generating the synthesis image at step S207 described above. Generally, an image scanned from a printed material has noise generated during printing or noise generated during image capture. Therefore, the present embodiment generates, as the synthesis image described above, an average image of the reference synthesis image and the base image. As is known, the pixel value of the pixel at the pixel position P in the average image indicates the average value of the pixel value of the pixel at the pixel position P in the base image and the pixel value of the pixel at the pixel position P in the reference synthesis image. Such an average image turns out to be an image with reduced noise components and a good S/N ratio. The noise generated in the reference image may causes reduction of detection precision, and therefore the present embodiment generates such an average image as a reference image.

Note that, taking into account displacement when capturing an image to be synthesized, image synthesis may be performed after aligning the reference synthesis image with the base image using a generally used alignment technique.

In addition, although the average image may be generated in the color space (e.g., RGB) of the original image when synthesizing images, image synthesis may be performed after converting the pixel values of each image to be synthesized into pixel values in another color space (e.g., standardized RGB values such as sRGB values or AdobeRGB values). Alternatively, image synthesis may be performed after converting RGB values of each image to be synthesized into tristimulus XYZ values, and reverse-converting the pixel values of the synthesis image into the RGB values again. In other words, the type of the color space is not limited as long as it allows the user to perform a desired synthesis process.

As has been described above, the present embodiment allows for using a synthesis image acquired by synthesizing only defect-free images for inspection of the presence or absence of a defect in a printed material, and therefore it becomes possible to reduce noise in the image to be referred, and improve the precision of inspection of the presence or absence of a defect.

Second Embodiment

In each of the following embodiments including the present embodiment, only the difference from the first embodiment will be described, assuming that they are similar to the first embodiment unless otherwise stated. In the first embodiment, a case has been described where only the selected image determined to be defect-free is used as the reference synthesis image, and the reference synthesis image is synthesized with the base image. In contrast, the present embodiment describes a case where all the synthesis candidate images are used as reference synthesis images, and each of the respective reference synthesis images is weighted according to the size of the location of the defect in the reference synthesis image, and subsequently synthesized with the base image.

Figure 4:
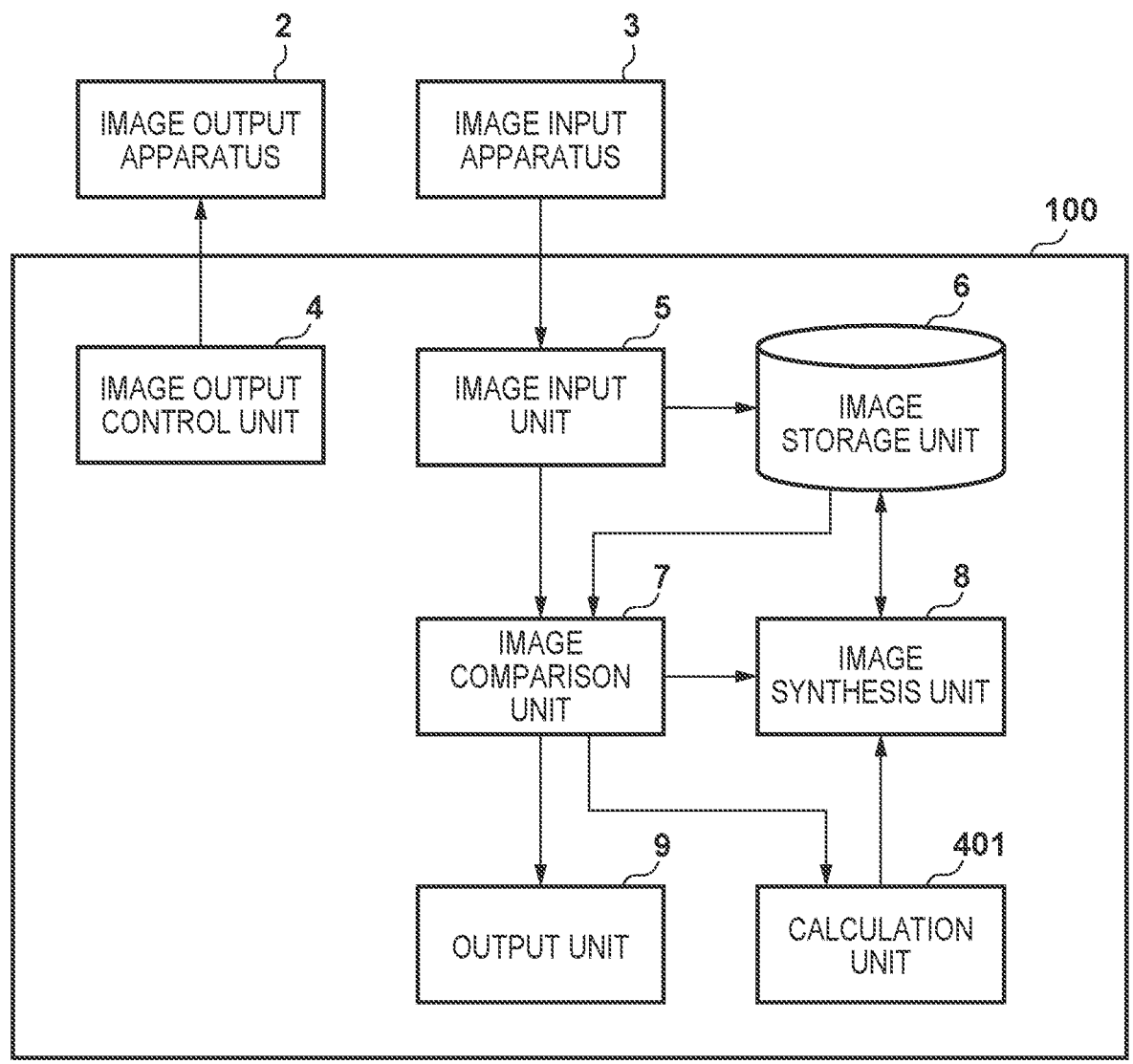
FIG. 4 is a block diagram illustrating a functional configuration example of the image processing apparatus 100.

First, there will be described a hardware configuration example of the image processing apparatus 100 according to the present embodiment, referring to the block diagram of FIG. 4. The configuration illustrated in FIG. 4 is one having a calculation unit 401 added to the configuration illustrated in FIG. 1. The calculation unit 401 calculates a weight coefficient in accordance with the size of the location of the defect in the selected image. With all the selected images being the reference synthesis images, the image synthesis unit 8 generates, as a reference image, a synthesis image acquired by synthesizing a base image and the reference synthesis images (selected images) weighted by a weight coefficient.

Figure 5:
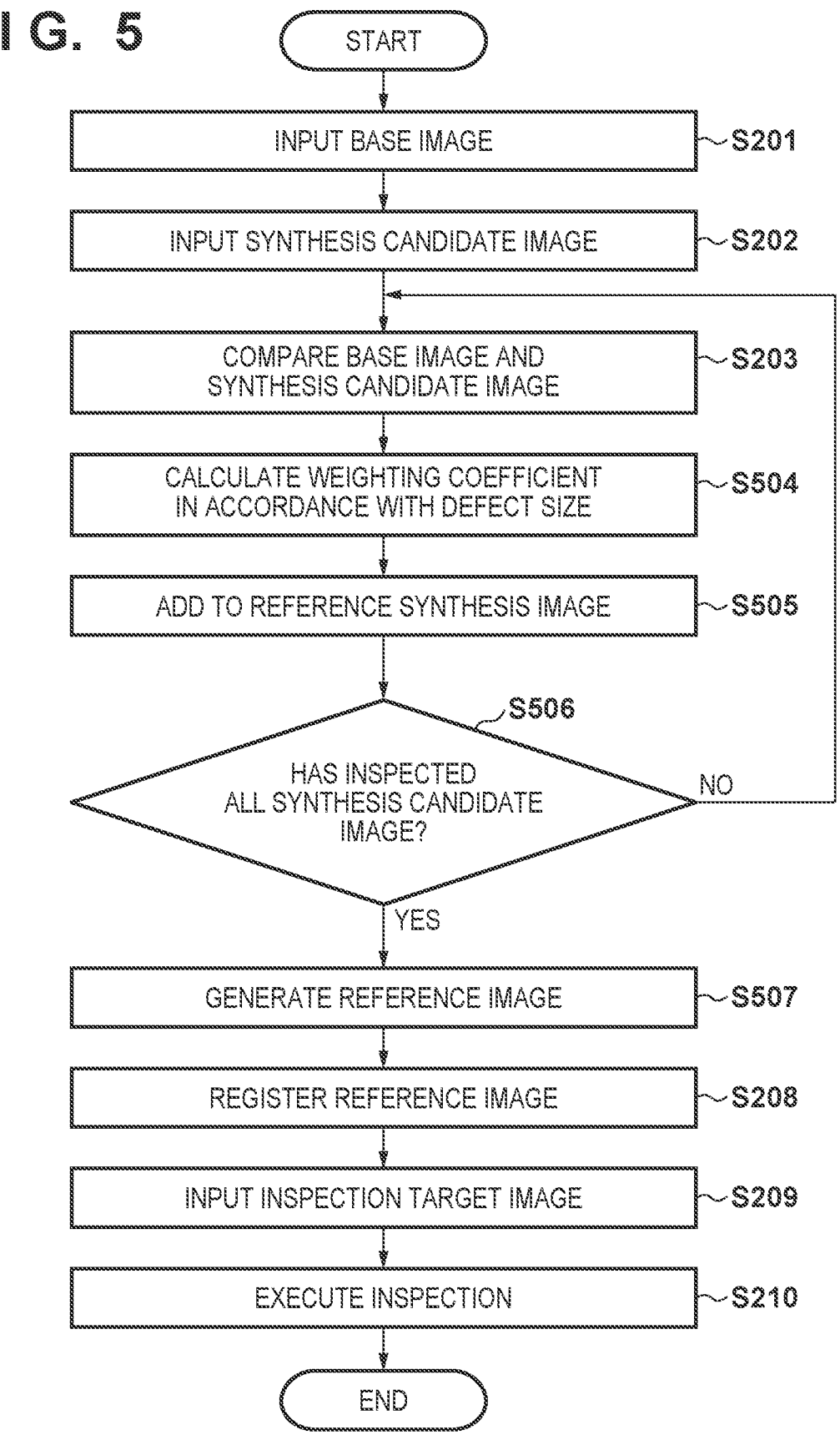
FIG. 5 is a flowchart illustrating a process performed by the image processing apparatus 100.

Next, there will be described a process performed by the image processing apparatus 100 in order to inspect the presence or absence of a defect in a printed material, referring to the flowchart of FIG. 5. In FIG. 5, process steps identical to those illustrated in FIG. 2 bear the same step numbers thereof, with descriptions of the process steps being omitted.

At step S504, the calculation unit 401 calculates a weight coefficient in accordance with the size of the location of the defect in the selected image. The size of the location of the defect may be the number of pixels included in the location of the defect, or the number of pixels in a rectangular area including the location of the defect, the definition of which not being limited to any particular definition. Details of the calculation method for the weight coefficient according to the size of the location of the defect will be described below.

At step S505, the image synthesis unit 8 sets a selected image as the reference synthesis image. At step S506, the image comparison unit 7 determines whether or not all of the one or more synthesis candidate images stored in the image storage unit 6 have been selected as the selected image. When, as a result of the determination, all of the one or more synthesis candidate images stored in the image storage unit 6 have been selected as the selected image, the process proceeds to step S507. When, on the other hand, there remains a synthesis candidate image which have not yet been selected as a selected image, among the one or more synthesis candidate images stored in the image storage unit 6, the process proceeds to step S203.

At step S507, the image synthesis unit 8 weights each of the reference synthesis images with the weight coefficient calculated for the reference synthesis image at step S504. The image synthesis unit 8 then generates, as a reference image, a synthesis image acquired by synthesizing all the weighted reference synthesis images and the base image. Details of the process at step S507 will be described below.

Next, there will be described the "calculation of a weight coefficient according to the size of location of the defect" at step S504 described above. The present embodiment uses the difference value between the pixel values of pixels at pixel positions corresponding to the base image and the selected image when determining the presence or absence of a defect in a selected image. Now, it is assumed that E is the total sum of the difference values between the pixel values of pixels at pixel positions corresponding to the base image and the i-th ($1 \leq i \leq N$, where N is the total number of synthesis candidate images) selected image. On this occasion, a weight coefficient w for the i-th selected image is calculated using a monotonically decreasing function, as illustrated in one of FIGS. 6A to 6C.

Figure 6A:
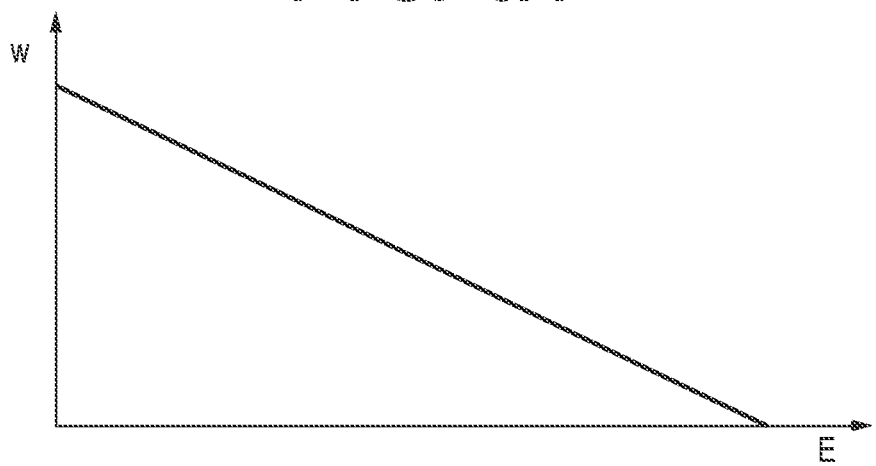
FIG. 6A illustrates an example of a monotonically decreasing function.
Figure 6B:
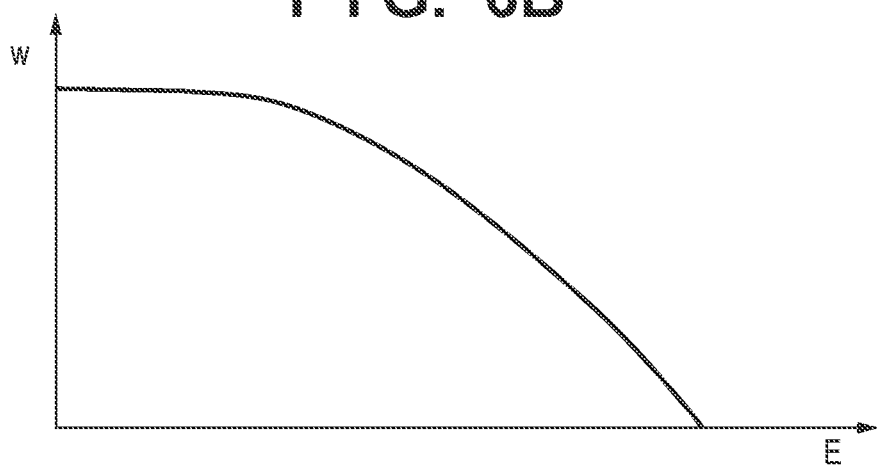
FIG. 6B illustrates an example of a monotonically decreasing function.
Figure 6C:
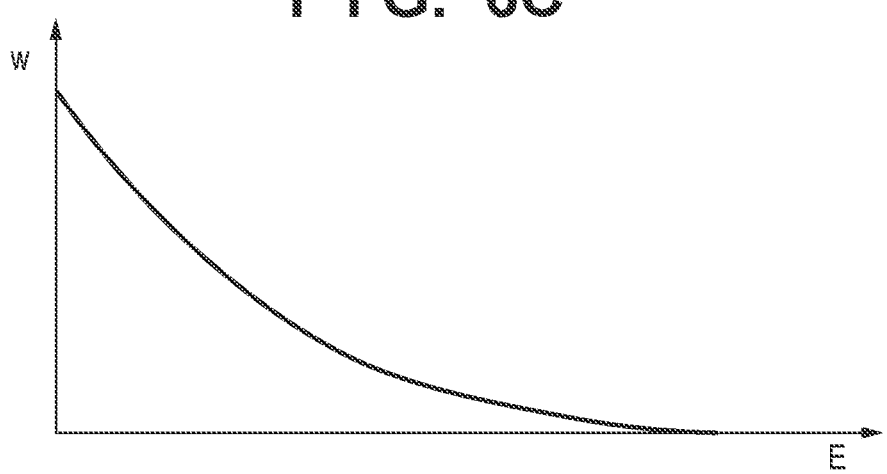
FIG. 6C illustrates an example of a monotonically decreasing function.

In FIGS. 6A to 6C, with the horizontal axis indicating the total sum E, the vertical axis indicating the weight coefficient w, all the monotonically decreasing functions illustrated in FIGS. 6A to 6C are decreasing functions with the weight coefficient w decreasing as the total sum E increases.

Therefore, at step S504, a weight coefficient w corresponding to the total sum E is specified in monotonically decreasing functions such as those illustrated in FIGS. 6A to 6C, and the specified weight coefficient w is specified as the weight coefficient for the selected image. Here, a weight coefficient for a defect-free selected image may be set to "1" (the weight coefficient corresponding to the total sum E=0 may be set to 1).

Note that the method for determining the weight coefficient of the selected image is not limited to the method described above, and the method is not limited to any specific method given that the larger the difference between the base image and a selected image becomes, the smaller the weight coefficient of the selected image becomes. Next, there will be described the image synthesis at step S507 described above. A pixel value R of a pixel at the position of a pixel of interest in the reference image is determined according to the following equation.

$$R = \frac{Rs + \sum_{i=1}^{N}(wi \times Rc\_i)}{1 + \sum_{i=1}^{N} wi} \quad \text{[Equation 1]}$$

In the preceding equation, Rs denotes the pixel value of the pixel at the position of the pixel of interest in the base image, wi denotes the weight coefficient calculated for the i-th selected image, and Rc_i denotes the pixel value of the pixel at the position of the pixel of interest in the i-th selected image.

As has been described above, even when a defect has been found in a selected image in the inspection processing of whether or not there exists a defect in the printed material, the present embodiment allows for reducing noise in the reference image and improving the precision of the inspection processing by synthesizing the selected images by multiplying them by a weight coefficient.

Third Embodiment

The present embodiment describes a printing system including the image processing apparatus 100 configured to inspect the presence or absence of a defect in a printed material supplied from an external printing apparatus. First, there will be described a configuration example of a printing system according to the present embodiment, referring to FIG. 7. The printing system includes a print server 180 configured to supply a print job, a printing apparatus 190 configured to generate a printed material by performing printing on a print medium such as paper based on the print job, and an image processing apparatus 100 as an inspection processing apparatus configured to inspect the presence or absence of a defect in the printed material.

First, there will be described the print server 180. The print server 180 supplies the printing apparatus 190 with a print job for printing a page. The print job may be generated by the print server 180 and supplied to the printing apparatus 190, or may be generated by a terminal device that can communicate with the print server 180, received by the print server 180 from the terminal device, and supplied to the printing apparatus 190.

Next, there will be described the printing apparatus 190. A sheet feed unit 191 has stacked thereon a stack of paper (print sheets), which is an example of a print medium. The printing apparatus 190, upon receiving a print job supplied from the print server 180, conveys a sheet stacked on the sheet feed unit 191 to a conveyance path 192, and performs printing on one or both sides of the conveyed sheet based on the print job. The printing apparatus 190 then conveys the printed sheet to a conveyance path 110 of the image processing apparatus 100, the conveyance path 110 being connected to the conveyance path 192.

Next, there will be described the image processing apparatus 100. The image processing apparatus 100 conveys, to the conveyance path 110, the printed material conveyed from the printing apparatus 190, scans the conveyed printed material to generate a scanned image of the printed material, and inspects, from the scanned image, the presence or absence of a defect in the printed material. When there exists a defect on the printed material (inspection failed), the image processing apparatus 100 discharges the printed material to a tray 112, or discharges the printed material to a tray 111 when the printed material is defect-free (inspection passed).

A CPU 101 performs various processes using computer programs and data stored in a RAM 102 or a ROM 103. The CPU 101 controls overall operations of the image processing apparatus 100, and also performs or controls respective processes described above to be performed by the image processing apparatus 100.

The RAM 102 has an area for storing computer programs and data loaded from the ROM 103 or a main storage device 104, and an area for storing scanned images generated by scanning the printed material by the image scanning device 105. The RAM 102 also includes a work area used when the CPU 101 executes various processing. In this way, the RAM 102 may provide various areas as appropriate.

The ROM 103 has stored therein computer programs and data that cause the CPU 101 to control overall operations of the image processing apparatus 100. In addition, the ROM 103 has stored therein computer programs and data that cause the CPU 101 to perform or control respective processes described above to be performed by the image processing apparatus 100.

The main storage device 104 has stored therein various application programs, and parameters used for various image processing. Here, a part of the computer programs and data described to be stored in the RAM 102 and the ROM 103 may be stored in the main storage device 104.

The image scanning device 105 scans one or both sides of a printed material conveyed over the conveyance path 110 to generate a scanned image of the printed material, and stores the scanned image in the RAM 102 or the main storage device 104.

An I/F (interface) 106 serves as an interface for conducting data communication with the printing apparatus 190. The image processing apparatus 100 synchronizes the processing timings of the printing apparatus 190 and the printed material via the I/F 106, or exchange mutual operating statuses.

An I/F 107, which is a serial bus interface such as USB and IEEE1394, serves as an interface for connecting various devices (such as memory devices) for reading and writing data from and to the image processing apparatus 100.

A UI (user interface) panel 108 has a liquid crystal screen and a touch panel screen. The UI panel 108 has a display function that displays various processing results from the CPU 101, such as a user interface for performing various operations such as printing, scanning, or data transmission, and a reception function for receiving input from a user operation. Here, the image processing apparatus 100 may have, in addition to the UI panel 108, a group of buttons that allow various types of instructions to be input.

The CPU 101, the RAM 102, the ROM 103, the main storage device 104, the image scanning device 105, the I/F 106, the I/F 107, and the UI panel 108 are all connected to a main bus 109.

Note that, although not illustrated in FIG. 7, the image processing apparatus 100 also has a mechanism for switching the discharge destination of the printed material conveyed over the conveyance path 110 to either the tray 111 or the tray 112 in accordance with control by the CPU 101.

In such a printing system, the image processing apparatus 100 can acquire the base image and the synthesis candidate image by scanning, by the image scanning device 105, the printed material supplied from the printing apparatus 190. The image processing apparatus 100 according to the present embodiment can thus generate the reference image by performing the processes described in the first embodiment and the second embodiment using the base image and the synthesis candidate image acquired as described above. In addition, the printing system described above allows the image processing apparatus 100 to acquire the inspection target image by scanning, by the image scanning device 105, the printed material supplied from the printing apparatus 190. The image processing apparatus 100 according to the present embodiment can thus inspect the presence or absence of a defect on the inspection target printed material by performing the processes described in the first embodiment and the second embodiment using the inspection target image acquired as described above.

Fourth Embodiment

Although the functional units of the image processing apparatus 100 illustrated in FIGS. 1 and 4 may be implemented by hardware, a part of them may be implemented by software (computer program). In the latter case, a computer apparatus that can execute computer programs corresponding to respective functional units except the image storage unit 6 can be applied to the image processing apparatus 100.

There will be described a hardware configuration example of a computer apparatus applicable to the image processing apparatus 100 according to the first embodiment and the image processing apparatus 100 according to the second embodiment, referring to the block diagram of FIG. 8.

A CPU 801 performs various processes using computer programs and data stored in a RAM 802 or a ROM 803. Accordingly, the CPU 801 controls overall operations of the computer apparatus, and also performs or controls respective processes described above to be executed by the image processing apparatus 100 to which the computer apparatus is applied.

The RAM 802 has an area for storing computer programs or data loaded from the ROM 803 or an external storage device 806. The RAM 802 has an area for storing data (e.g., scanned images input from the image input apparatus 3) received from the outside via an I/F 807. In addition, the RAM 802 has a work area used when the CPU 801 performs various processes. As has been described above, the RAM 802 can provide various areas as appropriate. The ROM 803 has stored therein setting data and the start-up program of the computer apparatus, or the like.

An operation unit 804, which is a user interface such as a keyboard, a mouse, a touch panel screen, or the like, allows various instructions to be input to the CPU 801 via a user operation.

A display unit 805, having a display screen such as a liquid crystal screen or a touch panel screen, can display results of processing by the CPU 801 as images, characters, or the like. For example, output results from the output unit 9 can be displayed on the display unit 805.

The external storage device 806 is a large-capacity information storage device such as a hard disk drive device. The external storage device 806 has stored therein the OS (operating system), and data and computer programs that causes the CPU 801 to perform or control respective processes described above to be executed by the image processing apparatus 100. The computer programs stored in the external storage device 806 includes computer programs corresponding to respective functional units except the image storage unit 6 among the functional units included in the image processing apparatus 100 illustrated in FIGS. 1 and 4. In addition, the data stored in the external storage device 806 includes information treated as known information in the above description.

The computer programs and data stored in the external storage device 806 are loaded to the RAM 802 as appropriate in accordance with control of the CPU 801, so as to be processed by the CPU 801. Note that the image storage unit 6 described above can be implemented in the RAM 802 or the external storage device 806.

The I/F 807 serves as a communication interface that allow the computer apparatus to perform data communication with an external device. For example, the computer apparatus outputs print data to the image output apparatus 2 via I/F 807, and acquires a scanned image generated by the image input apparatus 3 from the image input apparatus 3 via the I/F 807.

The CPU 801, the RAM 802, the ROM 803, the operation unit 804, the display unit 805, the external storage device 806, and the I/F 807 are all connected to a bus 808. Note that the configuration illustrated in FIG. 8 is merely an example of a hardware configuration applicable to the image processing apparatus 100, and may be changed/modified as appropriate.

Note that the numerical values, processing timings, processing order or the like used in the above description are given as an example for providing a specific description, and are not intended to be limiting.

Further, some or all of the embodiments described above may be used in combination as appropriate. Further, some or all of the embodiments described above may be used in a selective manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-030846, filed Feb. 26, 2020, which is hereby incorporated by reference herein in its entirety.

What is claimed is:

1. An image processing apparatus comprising:
a first acquisition unit configured to acquire a first image obtained by scanning a first printed material printed based on print data;
a second acquisition unit configured to acquire, as a composition candidate, one or more second images obtained by scanning a second printed material printed based on the print data;
a first inspection unit configured to inspect the one or more second images;
a removal unit configured to remove, from the composition candidate, the second image which is determined to be not suitable for the composition candidate among the inspected one or more second images; and
a generation unit configured to composite the first image and the second image that the removal unit does not remove from the composition candidate to generate a reference image being serving as a reference of inspection.

2. The image processing apparatus according to claim 1, further comprising a second inspection unit configured to inspect, based on the generated reference image, a third image obtained by scanning a third printed material printed based on the print data.

3. The image processing apparatus according to claim 2, wherein the second inspection unit inspects the third image based on a difference image indicating difference between the reference image and the third image.

4. The image processing apparatus according to claim 2, further comprising a control unit configured to control so as to output the third printed material to a first tray in a case where a result of inspection by the second inspection unit indicates inspection passed and control so as to output the third printed material to a second tray different from the first tray in a case where a result of inspection by the second inspection unit indicates inspection failed.

5. The image processing apparatus according to claim 2, further comprising a display control unit configured to control so as to display a result of inspection by the second inspection unit on a display unit.

6. The image processing apparatus according to claim 1, wherein the generation unit generates the reference image by performing pixel value averaging process using the first image and the second image that the removal unit does not remove from the composition candidate.

7. The image processing apparatus according to claim 1, wherein the generation unit generates the reference image by aligning the first image and the second image that the removal unit does not remove from the composition candidate and then compositing them.

8. The image processing apparatus according to claim 2, further comprising a print unit configured to print the first printed material, the second printed material, and the third printed material based on the print data.

9. The image processing apparatus according to claim 1, wherein the second printed material includes a plurality of printed materials and the second image includes a plurality of images.

10. An image processing method comprising:
acquiring a first image obtained by scanning a first printed material printed based on print data;
acquiring, as a composition candidate, one or more second images obtained by scanning a second printed material printed based on the print data;
inspecting the one or more second images;
removing, from the composition candidate, the second image which is determined to be not suitable for the composition candidate among the inspected one or more second images; and
compositing the first image and the second image which is not removed from the composition candidate to generate a reference image being serving as a reference of inspection.

11. A non-transitory computer-readable storage medium storing a computer program for causing a computer to function as:
a first acquisition unit configured to acquire a first image obtained by scanning a first printed material printed based on print data;

a second acquisition unit configured to acquire, as a composition candidate, one or more second images obtained by scanning a second printed material printed based on the print data;
a first inspection unit configured to inspect the one or more second images;
a removal unit configured to remove, from the composition candidate, the second image which is determined to be not suitable for the composition candidate among the inspected one or more second images; and
a generation unit configured to composite the first image and the second image that the removal unit does not remove from the composition candidate to generate a reference image being serving as a reference of inspection.

* * * * *